Feb. 23, 1932. G. B. DAMON 1,846,952
METHOD AND MEANS FOR HUMIDIFYING AND LOWERING ROOM TEMPERATURES
Filed Jan. 29, 1929
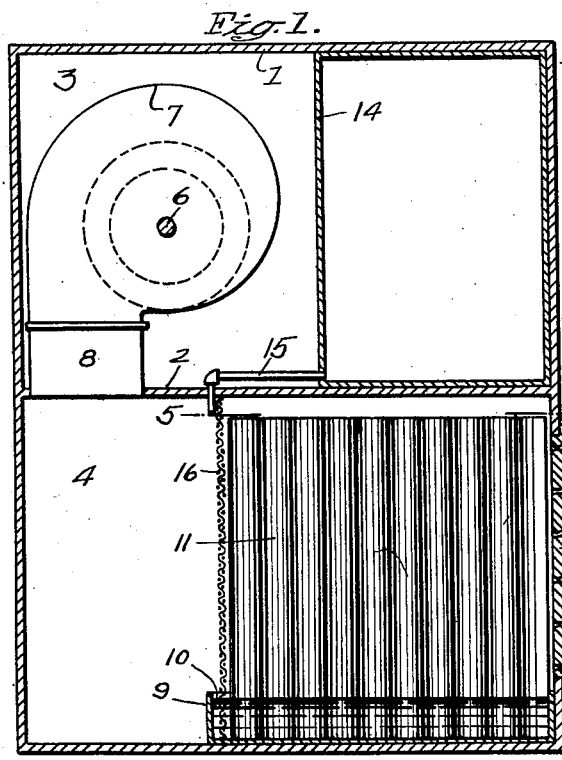
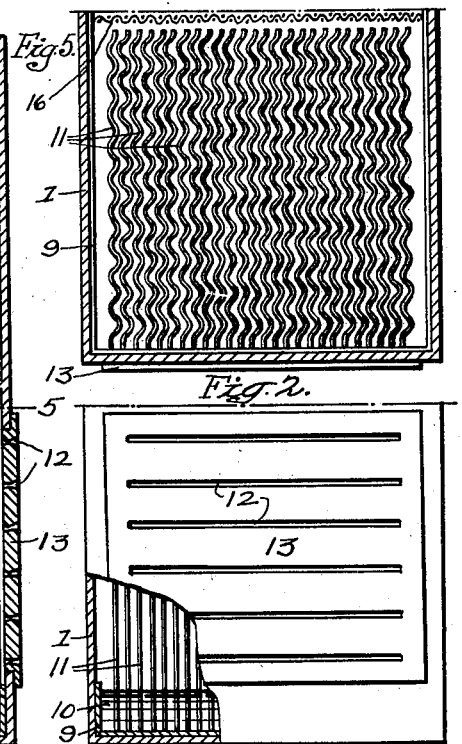
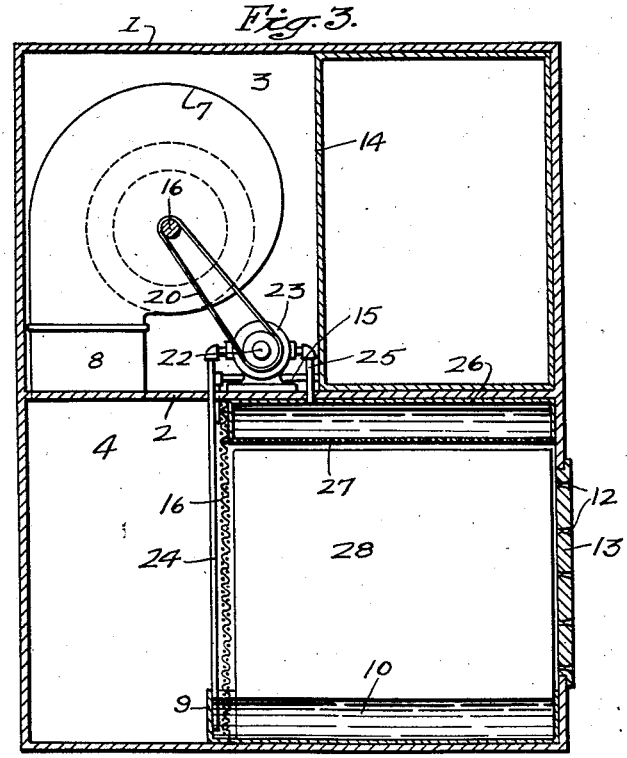
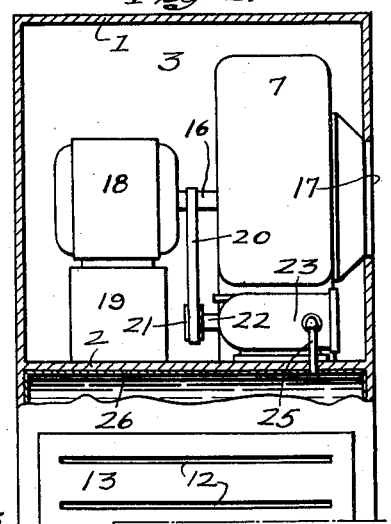
Inventor,
George B. Damon,
Bertha W. Damon,
Administratrix of the estate of
George B. Damon deceased,
by her Attorneys,
Howson & Howson Patented Feb. 23, 1932

1,846,952

UNITED STATES PATENT OFFICE

GEORGE B. DAMON, DECEASED, LATE OF BELVIDERE, NEW JERSEY, BY BERTHA W. DAMON, ADMINISTRATRIX, OF BELVIDERE, NEW JERSEY, ASSIGNOR OF ONE-THIRD EACH TO JOSEPH A. BUCKWALTER, AND ABRAHAM L. BUCKWALTER, BOTH OF ROYERSFORD, PENNSYLVANIA

METHOD AND MEANS FOR HUMIDIFYING AND LOWERING ROOM TEMPERATURES

Application filed January 29, 1929. Serial No. 335,828.

This invention relates to a method and means for cooling and humidifying air.

An object of the invention is to devise a simple, economical and efficient method for cooling and humidifying air.

Another object is to devise a method for cooling and humidifying air.

Another object is to devise a simple and efficient apparatus for cooling and humidifying air.

Other objects will appear hereinafter.

In the drawings which illustrate several applications of the invention:

Fig. 1 is a vertical transverse section showing the arrangement of the elements of the invention, one to another;

Fig. 2 is a fragmentary elevation partly broken away of the device shown in Fig. 1;

Fig. 3 is a vertical transverse section through a modified form of the invention;

Fig. 4 is a front view partly broken away of the device shown in Fig. 3, while

Fig. 5 is section of a detail taken on the line 5—5 of Fig. 1.

At 1 is shown any suitable form of housing, preferably provided with a division partition 2 separating it into upper and lower chambers 3 and 4. The upper portion 3 contains, in the present instance, a motor (not shown), a motor drive shaft 6, and a blower 7 of any conventional type, provided adjacent its lower portion with a blower casing 8, which communicates with the interior of the chamber 4. As will be readily understood, the blower 7 at its other end communicates with the exterior in any suitable manner, sucking in air which is expelled through the casing 8 into the chamber 4. Provided in the lower chamber 4 is a pan 9 containing water or other suitable cooling fluid 10. Mounted within the pan 9 are a plurality of vertically arranged plates 11 having the property of absorption and capillary attraction, functioning in a manner much similar to that of the ordinary candle wick. These plates are so arranged that they present a plurality of vertical longitudinal openings for the air entering into the chamber 4. As will be seen, the plates 11 are preferably corrugated to form serpentine passageways for the air from the blower casing 8.

The air, passing through the plates 11 is sufficiently cooled to a relatively low temperature, transferring its heat to the liquid in the plates; the cooled and filtered air then emerging through orifices 12 provided in the form of slits in a cover plate 13 mounted in the housing 1. As will be seen from an examination of Fig. 1, these openings 12 each have substantially the form of a Venturi column which has the tendency of permitting air, traversing the plates 11 under pressure of the blower 7, to expand and exit from the housing with increased velocity.

The upper chamber 3 is also provided with a refrigerating chamber 14 containing a suitable refrigerant which preferably may be dry ice (solidified $CO_2$), the chamber 14 communicating in any suitable manner as by pipe 15 with the upper portion of the chamber 4. Arranged adjacent the inlet of pipe 15 is a screen or other conventional form of foraminous covering 16 which is thoroughly chilled by the cold gas emerging from the pipe 15. Air, entering the chamber 4 from the blower casing 8 and passing through the screen 16 is chilled to a temperature below that of its dew-point, the air consequently giving up its moisture content in the form of a condensate which trickles down the screen 16 into the pan 9.

It will thus be seen that air is first relieved of all its suspended moisture in its passage through the screen 16, is then cooled in its passage through the labyrinths of plates 11 and then emerges through the apertures 12 of the plate 13 at a relatively high velocity.

Because of the intimate contact of the air with the screen 16 and the plates 11, the space occupied by these elements may be reduced to the smallest dimensions consistent with enough wet plate surface to effect the desired translation or transfer of heat, thus permitting a very compact and pleasing arrangement of elements.

It is of course understood that air might be sucked, rather than blown through the plates 11. However, in the latter case, the air would traverse the path of least resistance, and a part of the wet surfaces of the plates would not function as intended.

It is to be understood that the water can be lifted from the lower pan by means of a small pump actuated in any suitable manner and released into an upper pan as in Fig. 3, the water from the upper pan being permitted to fall through a number of small streams to the lower pan, the air passing through them at a right angle. It is further contemplated that the water or other cooling medium can be atomized by a pump driven from a motor shaft thus dispensing with the upper pan.

In the device shown in Figs. 3 and 4, air is admitted through the inlet 17 provided in the upper chamber 3. From thence it is sucked through the blower 7 and forced through the blower casing 8 into the lower chamber 4. Similar to the manner illustrated in Figs. 1 and 2, a refrigerant in the refrigerating chamber 14 supplies a medium for cooling the screen 16. Air passing through the screen on its journey from the blower casing 8 to the openings 12 of the cover plate 13 is cooled below its dew-point and deposits a condensate on the screen 16 which trickles into the pan or other suitable receptacle 9. Mounted on the motor shaft 16 by means of which the motor 18 mounted on base 19 rotates the fan within the blower 7, is a belt or other suitable driving means 20, actuating a pulley 21 mounted on a shaft 22 of a pump 23. By means of the pump 23 a cooling fluid can be pumped from the lower pan 19 through the pipe or other suitable conduit 24 to the pump 23, and thence through the pump 23 to an upper reservoir 26. As shown, this reservoir has a base 27 comprised of a foraminous plate, whereby the cooling liquid is released to trickle over suitable thin and impervious drip plates 28 mounted side by side and presenting a plurality of paths for the air entering through screen 16. The action of this device is similar to that shown in Figs. 1 and 2, the air from the blower 8 being relieved of its condensate by screen 16 and being chilled by passage over the wet plates 28.

It is readily seen that the temperature of a room or the like can be maintained at considerably below the exterior temperature by the use of my invention.

It is of course understood that the invention is susceptible to numerous modifications and adaptations, and it is intended that it be limited only by the scope of the appended claims.

What is claimed is:

1. In an air cooling device, means adapted to be dry chilled, arranged in the path of the air, to subject the air to dry chilling and to remove the moisture content thereof, means for holding a liquid in capillary suspension in the path of said air, thus further chilling it, and means for forcing the air through said two first-mentioned means.

2. The method of treating air which comprises the steps of forcing air under pressure through a channel, dry chilling the air below its dew point, thereby removing the moisture content of said air, further chilling the moisture-free air by a liquid held in capillary suspension, and releasing it into a locale which is to be cooled.

3. In an air cooling device, a screen adapted to be normally chilled, arranged in the path of the air, to remove the moisture content thereof, a pan containing a liquid, a plurality of porous plates mounted in said pan and arranged in the path of the moisture-free air, thus chilling it, and means for forcing the air through said screen and said plates.

4. In an air cooling device, a housing having an inlet and an outlet for air; means in said housing for removing the moisture content of the air; a pan containing a liquid mounted in said housing; a plurality of porous plates mounted in said pan and arranged in the path of the moisture-free air, for cooling the same; and means for forcing the air through said inlet, said first mentioned means, said plates and said outlet.

5. In an air cooling device, a screen adapted to be normally chilled arranged in the path of the air, to remove the moisture content thereof; a pan containing a liquid; a plurality of corrugated porous plates mounted in said pan and arranged to form a plurality of labyrinthal passages for the moisture-free air; thus chilling it, and means for forcing the air through said screen and said plates.

6. In an air cooling device, a housing having an inlet and an outlet for air, means in said housing for removing the moisture content of the air, a pan containing a liquid mounted in said housing, a plurality of corrugated porous plates mounted in said pan and arranged to form a plurality of labyrinthal passages for the moisture-free air, thus chilling it, and means for forcing the air through said screen and said plates.

7. In an air cooling device, a housing having an inlet and an outlet for air, said outlet being closed by a plate provided with a plurality of openings, each in the form of a Venturi column for accelerating the velocity of the emergent air, means in said housing for removing the moisture content of the air, a pan containing a liquid mounted in said housing, a plurality of corrugated porous plates mounted in said pan and arranged to form a plurality of labyrinthal passages for the moisture-free air, thus chilling it, and means for forcing the air through said screen and said plates.

8. In an air cooling device, a housing, a partition separating said housing into upper and lower compartments, a refrigerating chamber in said upper compartment communicating with said lower compartment, a screen in said lower compartment adapted to be chilled by said refrigerating chamber for removing the moisture content from the air, a pan containing a liquid in said lower compartment, a plurality of porous plates mounted in said pan and arranged in the path of said air for cooling it, and means in said upper compartment and communicating with the lower, for drawing air into said housing and for forcing it through said screen and said plates, and through a foraminous plate mounted in said housing to form an outlet therefore.

9. In an air cooling device, a screen adapted to be normally chilled arranged in the path of the air for removing the moisture content thereof, a refrigerating chamber containing dry ice adapted to cool said screen, a plurality of plates mounted in a liquid, and arranged in the path of the moisture-free air for chilling the same, and means for forcing the air through said screen and said plates.

10. In an air cooling device, a housing, a partition dividing said housing into upper and lower chambers, a blower mounted in said upper chamber and communicating with said lower chamber, an upper and lower reservoir mounted in said lower chamber, said upper reservoir being closed on its bottom with a foraminous cover, and means for forcing a liquid from said lower reservoir to said upper reservoir where it is dripped through the foraminous bottom into the path of the air passing in a channel therebeneath.

11. In an air cooling device, means for removing the moisture content of the air, a plurality of plates parallelly arranged in vertical planes, pans arranged above and below said plates, the plates being seated in the lower pan, and the other pan having a foraminous closure on its lower face, connections between said pans whereby a cooling medium in the lower pan can be passed into the upper, from whence it is dripped over the moisture-free air, to chill it, means for forcing air through said first-mentioned means and said plates, driving means for said last-mentioned means, and means driven by said driving means for pumping the cooling medium from the lower to the upper pan.

12. In an air cooling device, a housing, a partition dividing said housing into upper and lower chambers, an inlet for said air in said upper chamber and an outlet in said lower chamber, a fan, and driving means therefore in said upper chamber, a screen adapted to be normally chilled mounted in said lower chamber, a plurality of vertically extending plates between said screen and said outlet, means arranged above said plates for trickling a cooling medium thereover, means for collecting said medium, a connection between the two last-mentioned means, and a pump in said upper chamber and driven by said driving means, for forcing the medium from one to the other of said two last-mentioned means, the air being freed of its moisture content by the screen, and chilled during its passage through the plates, prior to being expelled through the outlet.

BERTHA W. DAMON,
*Administratrix of the Estate of George B. Damon, Deceased.*